United States Patent
Kodi (10) Patent No.: US 8,776,328 B2
(45) Date of Patent: Jul. 15, 2014

(54) REBAR CLIP FOR JOINING DIFFERENT SIZE BARS

(75) Inventor: Jon R. Kodi, Lebanon, TN (US)

(73) Assignee: Kodi Klip Corporation, Lebanon, TN (US)

( * ) Notice: Subject to any disclaimer, the term of this patent is extended or adjusted under 35 U.S.C. 154(b) by 585 days.

(21) Appl. No.: 12/818,676

(22) Filed: Jun. 18, 2010

(65) Prior Publication Data
US 2011/0308192 A1    Dec. 22, 2011

(51) Int. Cl.
*E04C 5/20* (2006.01)
*E04C 5/16* (2006.01)

(52) U.S. Cl.
USPC ............ 24/339; 52/677; 52/678; 52/684; 52/685; 52/686; 52/719

(58) Field of Classification Search
USPC ............ 24/339; 403/395, 396, 398–400; 52/684–687, 719
See application file for complete search history.

(56) References Cited

U.S. PATENT DOCUMENTS

| | | |
|---|---|---|
| 577,220 A | 2/1897 | Whitehead |
| 593,978 A | 11/1897 | Boehm |
| 721,434 A | 2/1903 | Edeburn |
| 942,007 A | 11/1909 | Morrill |
| 1,398,519 A | 11/1921 | Hosch |
| 1,451,717 A | 4/1923 | Sommer |
| 1,852,673 A | 4/1932 | Pilj |
| 1,986,528 A | 1/1935 | Ranger |
| 2,551,826 A | 5/1951 | Cox, Sr. |
| 2,571,337 A | 10/1951 | Burnham |
| 2,879,087 A | 3/1959 | Haglund |
| 3,006,115 A | 10/1961 | Hillberg |
| 3,033,412 A | 5/1962 | Fox |
| 3,216,752 A | 11/1965 | Rifken |
| 3,360,883 A | 1/1968 | Glanzer |
| 3,461,536 A | 8/1969 | Skold |
| 3,679,250 A | 7/1972 | Marsden |
| 3,694,988 A | 10/1972 | Skold |
| 3,788,025 A | 1/1974 | Holmes |

(Continued)

FOREIGN PATENT DOCUMENTS

| | | |
|---|---|---|
| FR | 1519097 A | 3/1968 |
| JP | 5245132 A | 4/1977 |

(Continued)

OTHER PUBLICATIONS

Exhibit A: Jiffy Clip Long Gun Applicator by Jiffy Clip, Inc. (see www.jiffyclip.com)(undated but admitted to be prior art).

(Continued)

*Primary Examiner* — Victor Batson
*Assistant Examiner* — Rowland Do
(74) *Attorney, Agent, or Firm* — Waddey & Patterson, P.C.; Lucian Wayne Beavers (57) ABSTRACT

A rebar clip is provided for joining a larger diameter rebar to a smaller diameter rebar transverse to the larger diameter rebar. In a first embodiment the clip includes diameter reducing tabs extending into upper arches of the clip for engagement with smaller diameter bars crossed on top of larger diameter bars. In a second embodiment the clip includes diameter reducing tabs extending into lower arches of the clip so that the clip may hold larger diameter bars on top of smaller diameter bars. A guide track for a clip applying gun is provided which allows for use with either version of clips and with clips of the same nominal diameter for joining equal size bars.

18 Claims, 11 Drawing Sheets

(56) References Cited

U.S. PATENT DOCUMENTS

| | | |
|---|---|---|
| 3,916,593 A | 11/1975 | Skold |
| 4,002,349 A | 1/1977 | Dopp |
| 4,034,529 A | 7/1977 | Lampus |
| 4,060,954 A | 12/1977 | Liuzza |
| 4,080,770 A | 3/1978 | Vigh |
| 4,110,951 A | 9/1978 | Padrun |
| 4,136,984 A | 1/1979 | Hayashi |
| 4,136,985 A | 1/1979 | Taul |
| 4,214,841 A | 7/1980 | Hayashi |
| 4,244,542 A | 1/1981 | Mathews |
| 4,334,613 A | 6/1982 | Males et al. |
| 4,362,423 A | 12/1982 | Miles |
| 4,388,791 A | 6/1983 | Anderson |
| 4,407,472 A | 10/1983 | Beck |
| 4,440,519 A | 4/1984 | Pennel et al. |
| 4,482,088 A | 11/1984 | Hyun |
| 4,511,073 A | 4/1985 | Furutsu |
| D281,393 S | 11/1985 | Karnhag et al. |
| 4,610,122 A | 9/1986 | De Clercq |
| 4,617,775 A | 10/1986 | Padrun |
| 4,707,892 A | 11/1987 | Nelson |
| D295,724 S | 5/1988 | Shioda |
| D296,074 S | 6/1988 | Seyfarth |
| 4,800,702 A | 1/1989 | Wheeler |
| 4,807,345 A | 2/1989 | Jacobson |
| 4,835,933 A | 6/1989 | Yung |
| 4,968,176 A | 11/1990 | Balach |
| 4,991,372 A | 2/1991 | Sonneville |
| D326,927 S | 6/1992 | Catalina |
| 5,127,763 A | 7/1992 | Kunoki |
| 5,269,054 A | 12/1993 | Poteat et al. |
| 5,370,293 A | 12/1994 | Bevins |
| 5,371,991 A | 12/1994 | Bechtel et al. |
| 5,379,562 A | 1/1995 | Hohmann |
| D355,582 S | 2/1995 | Sleight |
| D367,999 S | 3/1996 | McCallum |
| 5,518,399 A | 5/1996 | Sicurelli, Jr. et al. |
| D375,890 S | 11/1996 | Takai |
| 5,588,554 A | 12/1996 | Jones |
| 5,595,039 A | 1/1997 | Lowery |
| 5,626,436 A | 5/1997 | Dragone |
| 5,642,557 A | 7/1997 | Clews |
| 5,683,025 A | 11/1997 | Grendol |
| 5,688,428 A | 11/1997 | Maguire |
| 5,697,591 A | 12/1997 | Cooper |
| 5,752,297 A | 5/1998 | Ramey |
| 5,826,629 A | 10/1998 | West |
| 5,878,546 A | 3/1999 | Westover |
| 5,881,452 A | 3/1999 | Nowell, III et al. |
| 5,893,252 A | 4/1999 | Hardy et al. |
| 5,937,604 A | 8/1999 | Bowron |
| 5,938,099 A | 8/1999 | Ciccarelli |
| D421,318 S | 2/2000 | O'Brien et al. |
| 6,141,937 A | 11/2000 | Dressler |
| 6,148,488 A | 11/2000 | Gristock |
| 6,161,360 A | 12/2000 | Smith |
| 6,240,688 B1 | 6/2001 | Dressler |
| 6,276,108 B1 | 8/2001 | Padrun |
| 6,298,525 B1 | 10/2001 | Margo |
| D454,776 S | 3/2002 | Padrun |
| 6,354,054 B1 | 3/2002 | Verelli et al. |
| 6,371,763 B1 | 4/2002 | Sicurelli, Jr. et al. |
| 6,513,555 B1 | 2/2003 | Lesser et al. |
| 6,585,142 B1 | 7/2003 | Chen |
| 6,622,352 B2 | 9/2003 | Herron |
| 6,622,976 B1 | 9/2003 | Ianello |
| 6,663,316 B1 | 12/2003 | Harris |
| 6,672,498 B2 | 1/2004 | White et al. |
| 6,725,535 B2 | 4/2004 | Edson et al. |
| 6,857,246 B2 | 2/2005 | Erbetta et al. |
| 6,915,624 B2 | 7/2005 | Shibazaki et al. |
| 6,925,698 B2 | 8/2005 | Goodsmith et al. |
| 6,971,515 B2 | 12/2005 | Cooper et al. |
| 7,003,860 B2 | 2/2006 | Bloch et al. |
| D529,794 S | 10/2006 | Murray |
| 7,147,209 B2 | 12/2006 | Jones et al. |
| 7,152,831 B2 | 12/2006 | Riedy et al. |
| D534,418 S | 1/2007 | Minor et al. |
| 2003/0154579 A1 | 8/2003 | Disher |
| 2004/0040247 A1 | 3/2004 | Morse |
| 2004/0154261 A1 | 8/2004 | Miller |
| 2004/0261352 A1 | 12/2004 | Bennett et al. |
| 2005/0217198 A1 | 10/2005 | Carraher et al. |
| 2006/0248844 A1 | 11/2006 | Kodi |
| 2007/0284385 A1 | 12/2007 | Carraher et al. |
| 2008/0115448 A1 | 5/2008 | Kodi |
| 2008/0115449 A1 | 5/2008 | Kodi |
| 2008/0118304 A1 | 5/2008 | Carraher et al. |
| 2008/0271409 A1 | 11/2008 | Kodi |

FOREIGN PATENT DOCUMENTS

| | | |
|---|---|---|
| JP | 4108944 | 4/1992 |
| WO | 2006031407 A2 | 3/2006 |
| WO | 2006033883 A2 | 3/2006 |
| WO | 2006118611 A2 | 11/2006 |
| WO | 2008000258 A1 | 1/2008 |

OTHER PUBLICATIONS

U.S. Appl. No. 11/142,539, filed Jun. 1, 2005 to Kodi (unpublished)(copy provided)(not prior art).

U.S. Appl. No. 12/762,409, filed Apr. 19, 2010 to Kodi (unpublished)(not prior art).

PCT Search Report in corresponding International Application No. PCT/US2011/038675, dated Feb. 7, 2012. (not prior art).

PCT Search Report in International Application No. PCT/US2011/038675, dated Sep. 14, 2011. (not prior art).

International Preliminary Report on Patentability in corresponding International Application No. PCT/US2011/038675, dated Jan. 3, 2013. (not prior art).

REBAR CLIP FOR JOINING DIFFERENT SIZE BARS

I, Jon R. Kodi, a citizen of the United States, residing at Lebanon, Tennessee, have invented a new and useful "Rebar Clip For Joining Different Size Bars".

BACKGROUND OF THE INVENTION

1. Field of the Invention

The present disclosure is directed to resilient plastic clips for use in joining reinforcing bars, and particularly to a clip, and clip applying apparatus for use therewith, which is suitable for joining bars of different sizes.

2. Description of the Prior Art

Resilient plastic clips have been proposed for use in joining reinforcing bars for the construction of reinforced concrete structures. U.S. Pat. No. 5,626,436 to Dragone, and assigned to the Assignee of the present invention, discloses a resilient clip designed to connect a smaller diameter reinforcing bar transversely on top of a larger diameter reinforcing bar.

U.S. Patent Application Publication No. 2006/0248844 to Kodi, discloses a resilient clip for connecting reinforcing bars of equal diameter. The clip of Kodi U.S. Patent Application Publication 2006/0248844 is designed to connect bars of equal diameter either in a parallel orientation or a transverse orientation.

U.S. Patent Application Publication No. 2008/0115449 to Kodi discloses a bar connecting apparatus for use in applying clips like those of the Kodi U.S. Patent Application Publication No. 2006/0248844 to bars of equal diameter.

There is a continuing need for improvements in the design of such clips and apparatus for applying the same.

SUMMARY OF THE INVENTION

In one embodiment a rebar clip is disclosed for joining a larger nominal diameter rebar and a smaller nominal diameter rebar crossed perpendicularly to each other. The clip includes a clip body, a lower pair of aligned partially circular lower lateral openings defined in the clip body and aligned in a first direction, and an upper pair of aligned partially circular upper lateral openings defined in the clip body transversely to the first direction. Both the lower pair of lateral openings and the upper pair of lateral openings are of the larger nominal diameter. The clip body is downwardly open below both the lower and upper pairs of lateral openings so that the clip can be pressed downward over the crossed larger and smaller nominal diameter rebars. A pair of opposed diameter reducing tabs extend toward each other into the lateral openings of one of said lower and upper pairs of lateral openings to engage the smaller nominal diameter rebar.

When the diameter reducing tabs are located within the lower pair of lateral openings the clip can hold the larger nominal diameter rebar in place above the smaller nominal diameter rebar.

When the diameter reducing tabs are located within the upper pair of lateral openings the clip can hold the smaller nominal diameter rebar in place above the larger nominal diameter rebar.

In an embodiment, the diameter reducing tabs are located within the upper pair of lateral openings, and the tabs of each one of the upper lateral openings define a vertical slot therebetween for receiving a guide bar. A string of such clips, each of the clips being substantially identical, are joined together with the vertical slots between tabs being aligned with each other for receiving the guide bar to guide the string of clips.

In another embodiment a rebar clip is provided for joining a larger diameter rebar to a smaller diameter rebar transverse to the larger diameter rebar. The rebar clip includes a clip body defined along x, y and z orthogonal directions. The clip body includes first and second pairs of resilient legs extending in the z-direction and defining first and second lower arches aligned parallel to the x-direction. The clip body includes first and second pairs of resilient arms extending in the z-direction away from the legs. The arms define first and second upper cradles aligned parallel to the x-direction. The clip body includes first and second bridges joining distal ends of the first pair of arms to distal ends of the second pair of arms. The bridges and the arms define first and second upper arches aligned parallel to the y-direction. The lower arches, the upper cradles and the upper arches each include curved portions of the larger diameter. Pairs of diameter reducing tabs extend into either the lower arches or the upper arches for engaging the smaller diameter rebar.

In an embodiment the diameter reducing tabs extend into the lower arches so that the clip can hold the larger diameter rebar in place above the smaller diameter rebar.

In another embodiment, the diameter reducing tabs extend into the upper arches so that the clip can hold the smaller diameter rebar in place above the larger diameter rebar.

In an embodiment a string of substantially identical size clips are joined together with vertical slots between tabs in the upper arches aligned with each other for receiving a guide bar to guide the string of clips.

In an embodiment an apparatus is provided for applying a clip to first and second reinforcing bars. The apparatus includes a barrel having a distal end and a clip receiving cavity. A hammer is received in the barrel. A main drive is connected to the hammer for reciprocating the hammer within the barrel. A trigger assembly is connected to the main drive to actuate reciprocation of the hammer. A clip track is connected to the barrel. The clip track is aligned with the cavity for guiding a string of frangibly connected clips into the cavity. The clip track has a longitudinal axis extending transversely from the barrel. The clip track has a cross-sectional shape perpendicular to its longitudinal axis, which cross-sectional shape has a base portion having a base width defined between two sides, and a neck portion having a neck width defined between two neck sides. The neck width is less than the base width. The neck portion can be received between tabs in a string of clips for guiding the string of clips.

In another embodiment an apparatus for applying a clip to first and second reinforcing bars includes a barrel having a clip receiving cavity sized to receive a clip for joining two equal diameter crossed rebars of a first diameter. The apparatus includes a clip track connected to the barrel and aligned with the cavity for guiding a string of clips into the cavity. The clip track has a base portion having a base thickness, and the clip track has a neck portion extending from the base portion and having a neck thickness less than the base thickness. This permits the clip track to be used to selectively receive and guide into the cavity either a string of clips for joining two equal diameter crossed rebars or a string of clips for joining a smaller diameter rebar to a rebar of the first diameter.

Numerous objects, features and advantages of the present invention will be readily apparent to those skilled in the art upon a reading of the following disclosure when taken in conjunction with the accompanying drawings.

DETAILED DESCRIPTION

Figure 4:
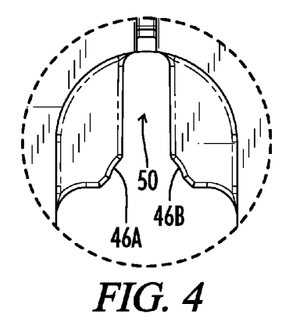
FIG. 4 is an enlarged view of the area encircled and designated by the numeral 4 in FIG. 2.
Figure 5:
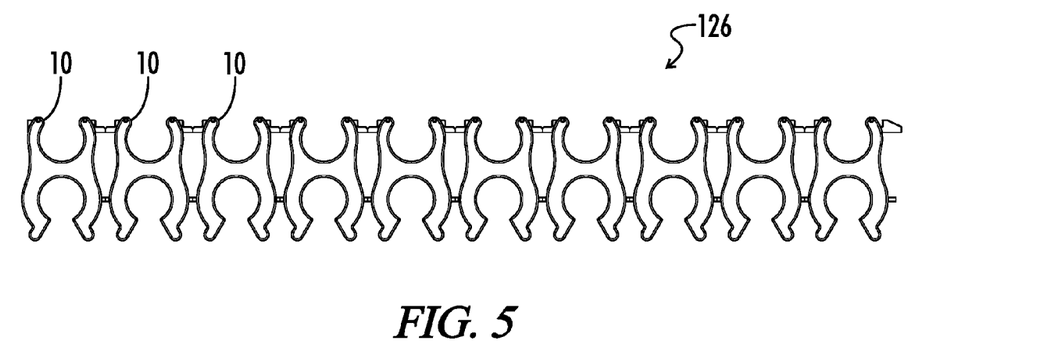
FIG. 5 is a side view of a string of clips like those of FIGS. 1-4, wherein each of the clips is shown in a side view similar to FIG. 3.
Figure 6:
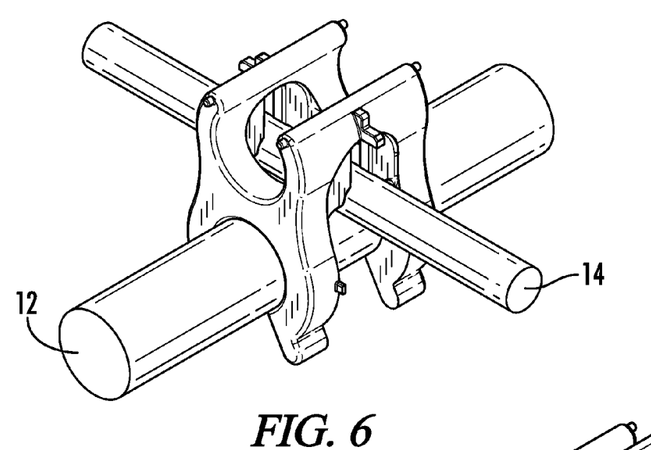
FIG. 6 is a perspective view of a clip like that of FIGS. 1-4 in place upon two transversely crossed rebars, with a smaller diameter rebar on top of a larger diameter rebar.

Referring now to FIGS. 1-7, a first embodiment of a rebar clip is shown and generally designated by the numeral 10. As seen in FIG. 6, the rebar clip 10 can join a larger nominal diameter rebar 12 to a smaller nominal diameter rebar 14 crossed perpendicularly relative to each other.

The rebar clip 10 includes a clip body 16. The clip body 16 can be described as being defined along x, y and z orthogonal directions. The x, y and z directions are illustrated for example in FIGS. 2 and 3, wherein the z-direction represents the direction parallel to the height of the clip, and the x and y directions define planes generally parallel to the planes in which the rebars such as 12 and 14 will extend.

The clip body includes first and second pairs of resilient legs 18 and 20. Each pair of legs includes two legs such as 18A and 18B seen in FIG. 3. The pairs of resilient legs 18 and 20 extend in the z-direction and define first and second lower arches 22 and 24 aligned parallel to the x-direction.

The clip body 16 further includes first and second pairs of resilient arms 26 and 28 extending in the z-direction away from the legs 18 and 20. Each pair of arms such as pair 26 includes two arms 26A and 26B. The arms define first and second upper cradles 30 and 32 which are aligned parallel to the x- direction.

The clip body 16 includes first and second bridges 34 and 36 joining distal ends of the first pair of arms 26A, 26B to the second pair of arms 28A, 28B.

The bridges 34 and 36 and the arms 26 and 28 define first and second upper arches 38 and 40 aligned parallel to the y-direction.

Figure 1:
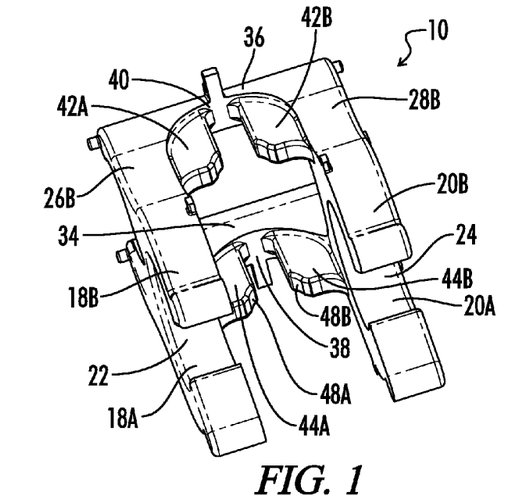
FIG. 1 is a perspective view of an embodiment of a resilient clip.
Figure 2:
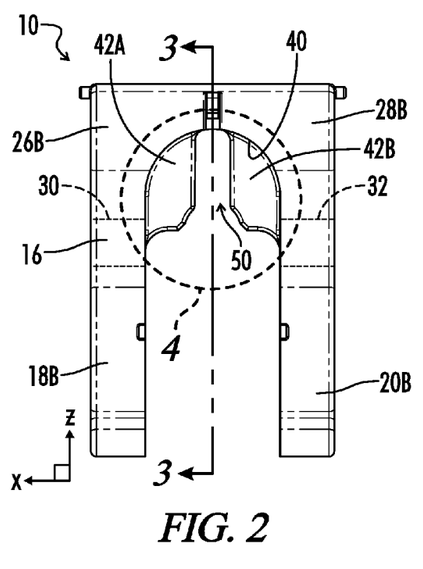
FIG. 2 is an elevation view of the clip of FIG. 1 showing an upper arch having a pair of diameter reducing tabs.
Figure 3:
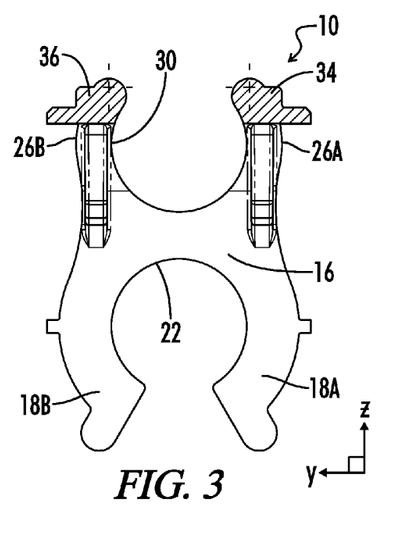
FIG. 3 is an elevation sectioned view taken along line 3-3 of FIG. 2.

As is thus seen in FIGS. 2 and 3, and the lower arches 22 and 24, the upper cradles 30 and 32, and the upper arches 38 and 40 each include curved portions having a diameter substantially equal to the diameter of the larger diameter rebar 12.

Each of the upper arches 38 and 40 has a pair of diameter reducing tabs 42 and 44, respectively. The pair of tabs 42 includes tabs 42A and 42B. The pair of tabs 44 includes tabs 44A and 44B.

In the embodiment shown in FIGS. 1-7, the diameter reducing tabs 42 and 44 extend into the upper arches 38 and 40 so that the clip 10 can hold the smaller diameter rebar 14 in place above the larger diameter rebar 12.

As is best seen in the enlarged view of FIG. 4, each pair of the diameter reducing tabs such as 42A and 42B includes opposed obliquely downward facing concave corners such as 46A and 46B for engaging the smaller diameter rebar from above. Similar corners 48A and 48B are present on the tabs 44A and 44B.

Figure 18:
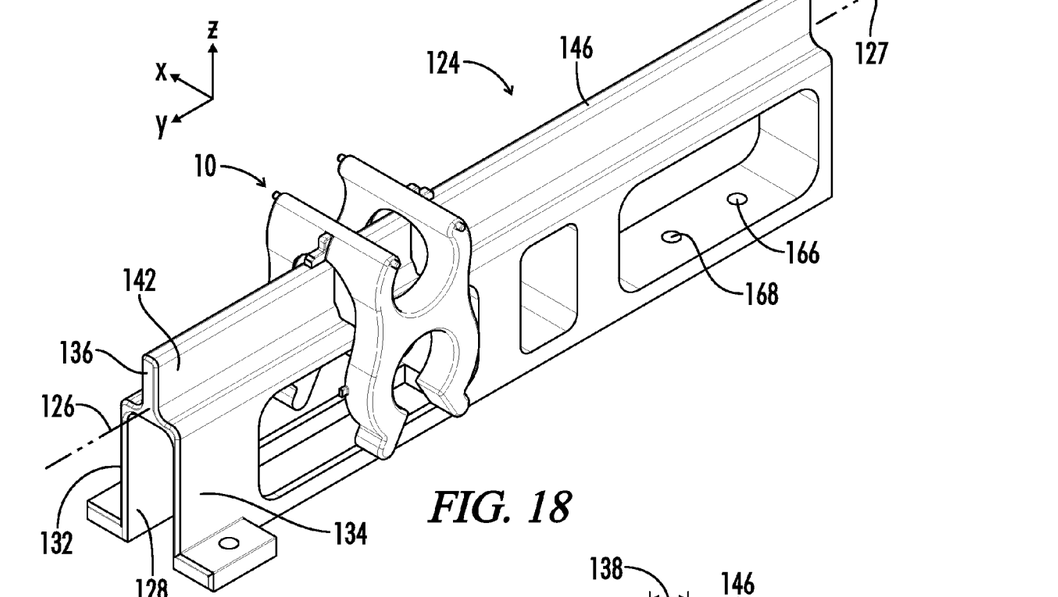
FIG. 18 is a perspective view of the clip track of the clip applying apparatus of FIGS. 16 and 17, showing a clip like that of FIGS. 1-4 in place thereon.
Figure 19:
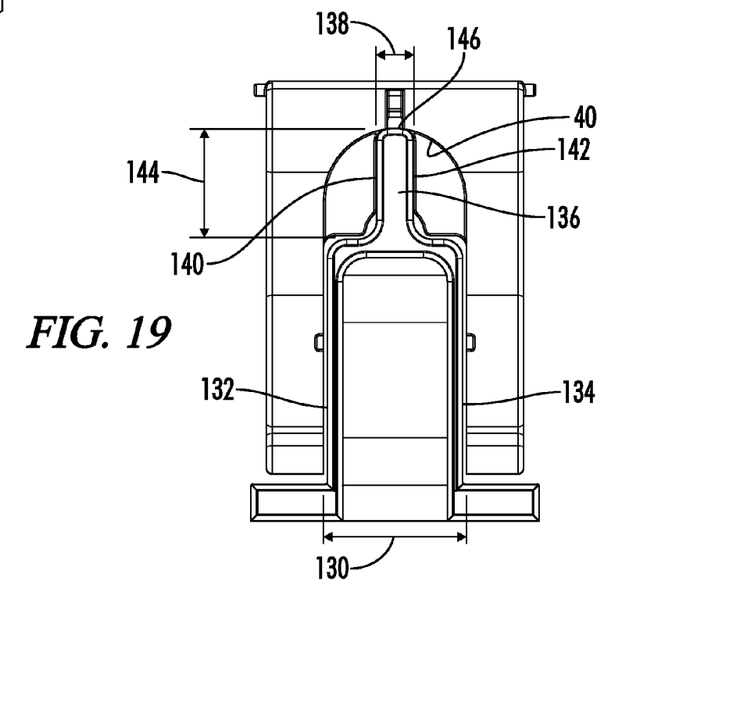
FIG. 19 is an end view of the clip track and clip assembly of FIG. 18.

As best seen in FIGS. 2 and 4, each of the pairs of tabs such as 42 and 44 defines a vertical slot 50 therebetweeen for receiving a guide bar or guide track 124 such as shown for example in FIGS. 18 and 19.

FIG. 5 illustrates a string of clips each identical to the rebar clip 10 just described, the clips being joined together with the vertical slots 50 between tabs 42 and 44 aligned with each other for receiving the guide bar to guide the string of clips.

As is best seen in FIG. 3, the first and second lower arches 22 and 24 can be described as a lower pair of aligned partially circular lower lateral openings defined in the clip body 16 and aligned in a first direction, namely the x-direction.

As best seen in FIG. 2, the first and second upper arches 38 and 40 can be described as an upper pair of aligned partially circular upper lateral openings defined in the clip body 16 transversely to the first direction, namely aligned in the direction y.

It is noted that the circular portions of the upper arches 38 and 40 are of the same nominal diameter as are the lower arches 22 and 24, which are equal to the nominal diameter of the larger diameter rebar 12.

The clip 10 can be described as being downwardly open below the lower arches 22, 24 and the upper arches 38, 40 so that the clip 10 can be pressed downward over the crossed larger and smaller diameter rebars 12 and 14 as shown in FIG. 6.

Figure 7:
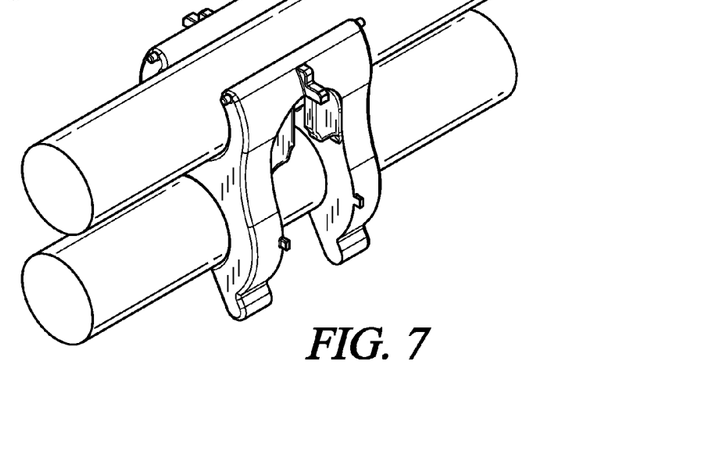
FIG. 7 is a perspective view of a clip like that of FIGS. 1-4 showing the joining of two parallel bars of the larger diameter.

It is noted that although the clip 10 is primarily intended for use in joining smaller diameter bars transversely on top of larger diameter bars as shown in FIG. 6, the clip 10 can also be utilized as shown in FIG. 7 to join two parallel bars of equal diameter.

The Embodiment of FIGS. 8-15

Figure 12:
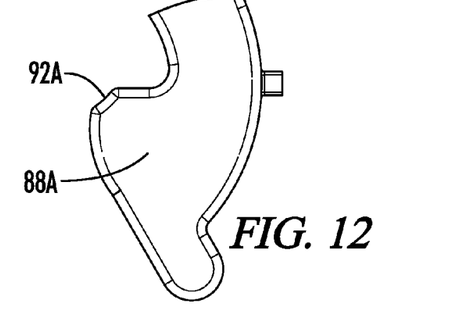
FIG. 12 is an enlarged view of the encircled area designated 12 in FIG. 9.
Figure 13:
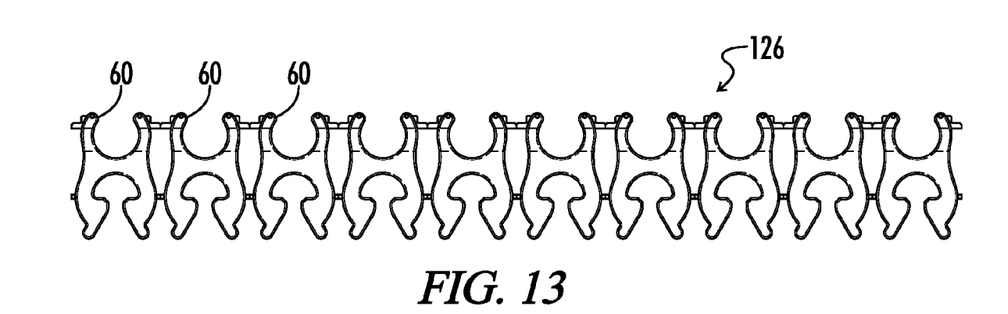
FIG. 13 is a side elevation view of a string of clips like those of FIG. 9.
Figure 14:
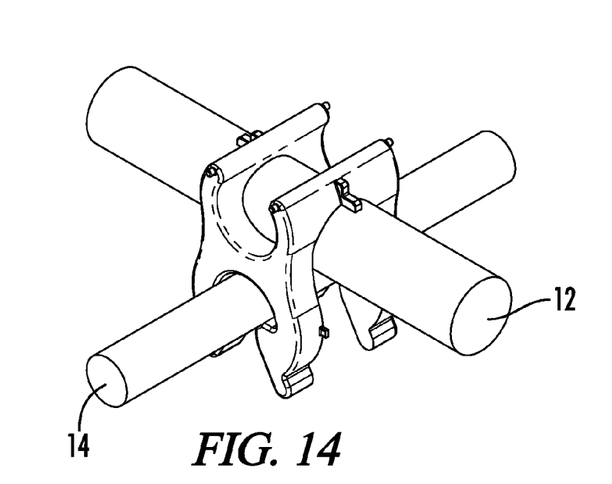
FIG. 14 a perspective view of a clip like that of FIGS. 8-12 in place over a pair of crossed reinforcing bars wherein a larger diameter bar is held on top of a smaller diameter bar.

Referring now to FIGS. 8-15, an alternative embodiment of the clip is shown and generally designated by the numeral 60. As will be seen, the clip 60 is similar to the clip 10, except in the clip 60 the diameter reducing tabs are placed within the lower arches rather than the upper arches, so that the tabs can hold the smaller diameter rebar 14 in place below the larger diameter rebar 12 as shown in FIG. 14.

Thus the rebar clip 60 has a clip body 62 having first and second pairs of legs 64 and 66 defining first and second lower arches 68 and 70. The clip body 62 includes first and second pairs of arms 72 and 74 defining first and second upper cradles 76 and 78.

First and second bridges 80 and 82 join the first pair of arms 72 to the second pair of arms 74. The arms and bridges together define the first and second upper arches 84 and 86.

In the embodiment of FIGS. 8-15, there are first and second pairs of diameter reducing tabs 88A and 88B, and 90A and 90B, extending into the lower arches 68 and 70, respectively, so that the clip 60 can hold the larger diameter rebar 12 in place above the lower diameter rebar 14, with the tabs 88 and 90 engaging the lower diameter rebar 14 from below.

As is best seen in FIG. 12, each pair of diameter reducing tabs includes opposed obliquely upward facing concave corners such as 92A and 92B. It is the corners such as 92A and 92B of the tabs which engage the smaller diameter rebar from below.

Figure 9:
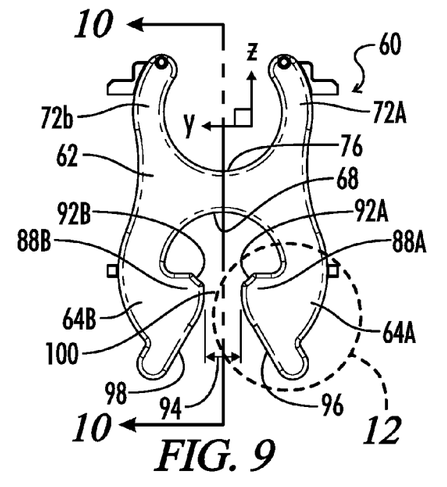
FIG. 9 is a side elevation view of the clip of FIG. 8 showing a pair of diameter reducing tabs extending into a lower arch.

As best seen in FIG. 9, each pair of legs such as 64A-64B defines a lower gap dimension 94.

As is best seen in FIG. 9, each leg of the pair of legs such as 64A and 64B are downwardly flared away from each other as indicated at 96 and 98 to provide a tapered guide into the gap 94 for a lower one of the crossed rebars being joined. In the embodiment of FIGS. 8-15 that lower rebar is the smaller diameter rebar 14.

As best seen in FIGS. 9 and 12, the tabs such as 88A and 88B associated with each pair of legs define a vertical path 100 having a width substantially equal to the gap dimension 94.

Figure 8:
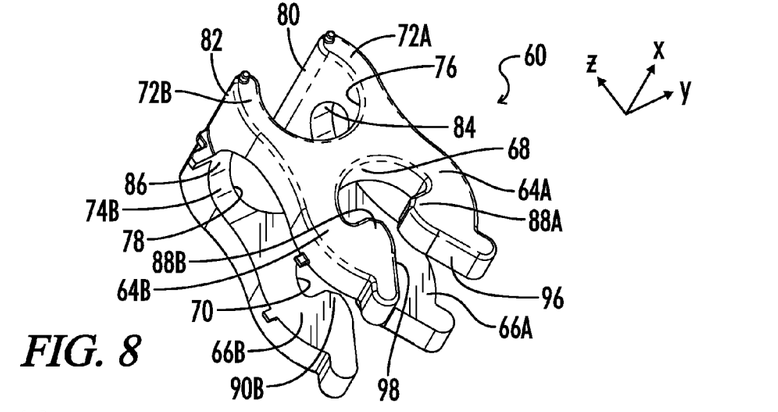
FIG. 8 is a perspective view of another embodiment of a rebar clip.
Figure 10:
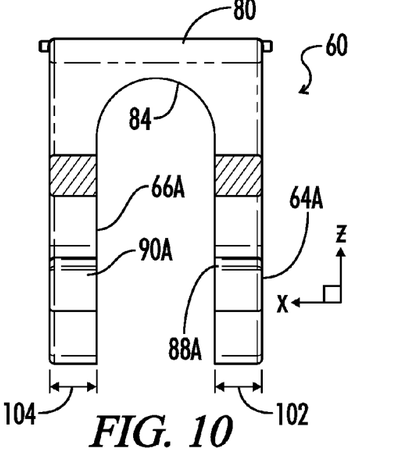
FIG. 10 is an elevation sectioned view of the clip of FIG. 9 taken along line 10-10 of FIG. 9.
Figure 11:
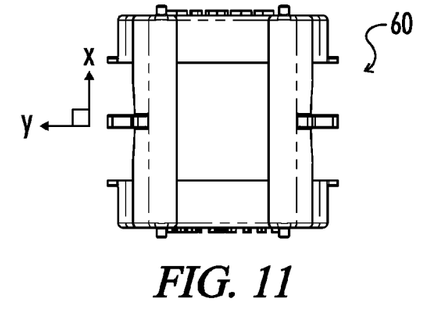
FIG. 11 is a bottom view of the clip of FIG. 9.

As seen in FIG. 10, the legs such as 64A and 66A each have a leg thickness 102 and 104, respectively, in the x-direction. Additionally, the tabs such as 88A and 90A each have a tab thickness in the x-direction, the tab thicknesses being equal to the leg thicknesses 102 and 104, respectively. Furthermore, as best seen in FIGS. 8 and 10, the tabs are flush with the sides of the legs closest to the other pair of legs.

Figure 17:
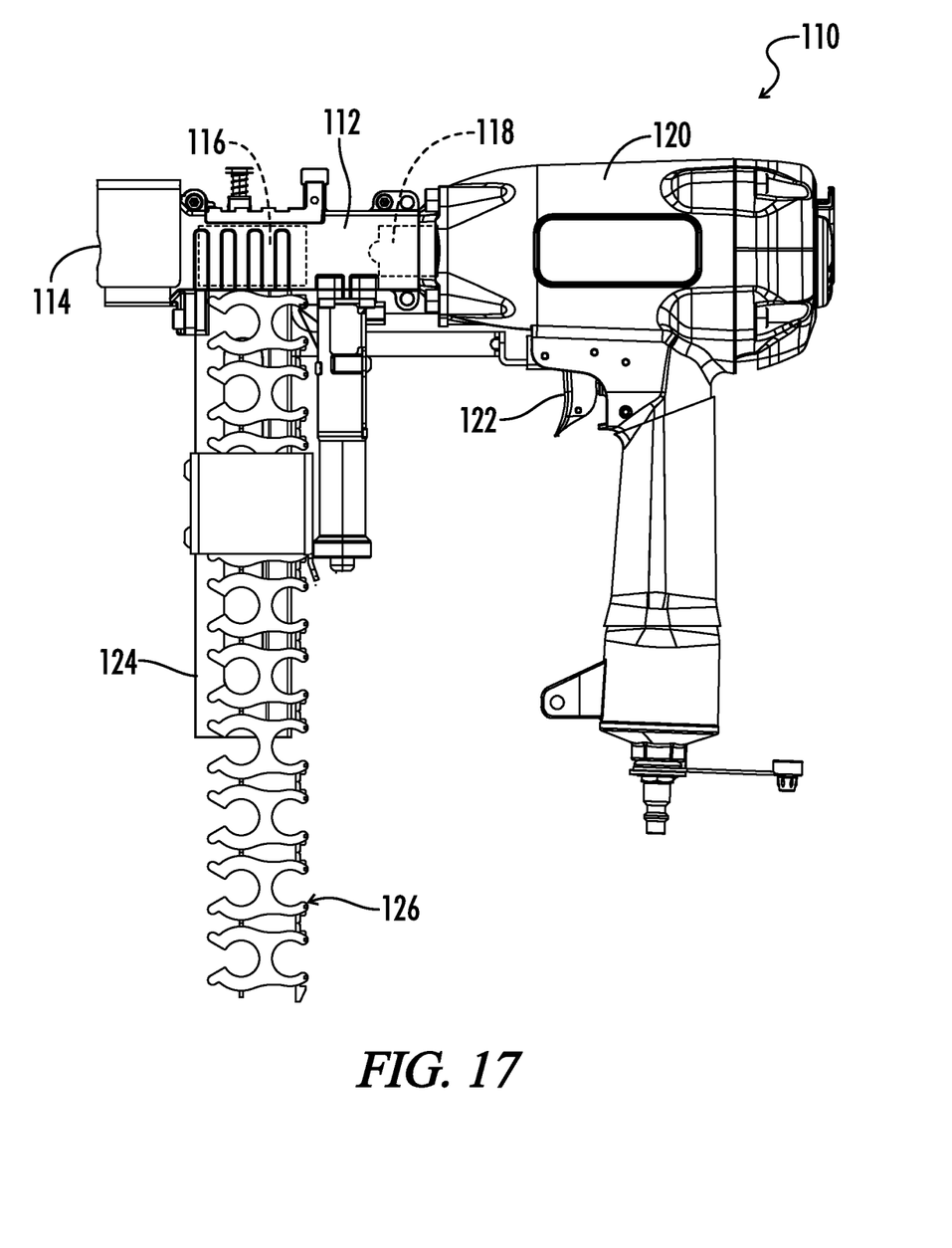
FIG. 17 is a left side elevation view of the clip applying apparatus of FIG. 16.
Figure 24:
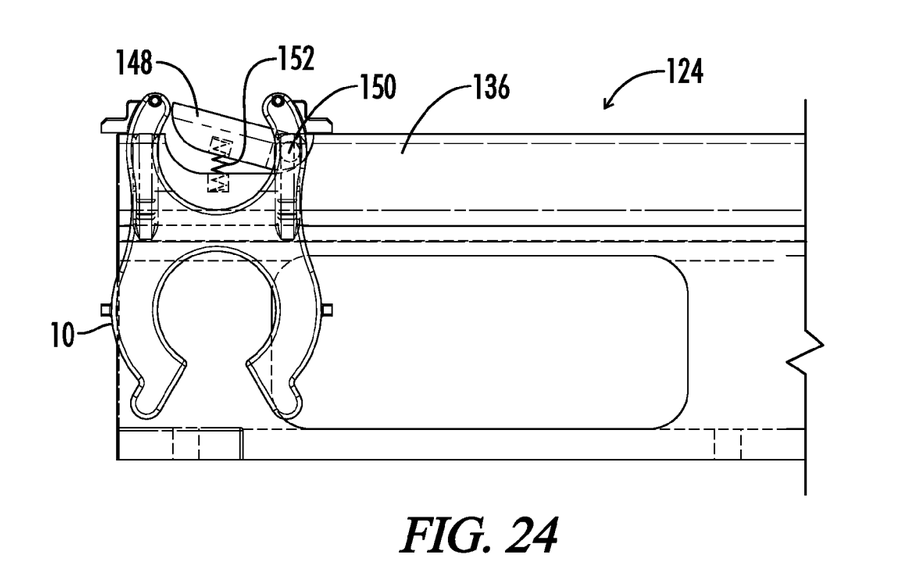
FIG. 24 is a side elevation view of the clip track of FIGS. 20 and 21 showing the string retainer biased laterally outward away from the clip track and in engagement with a clip as it would be to hold a string of such clips in place upon the clip track.

FIG. 13 shows a string of clips identical to the clip 60, the clips being joined together with their upper arches 84 and 86 aligned with each other so that the string of clips can be received upon a guide bar in a manner like that shown in FIGS. 17, 18 and 24.

Figure 15:
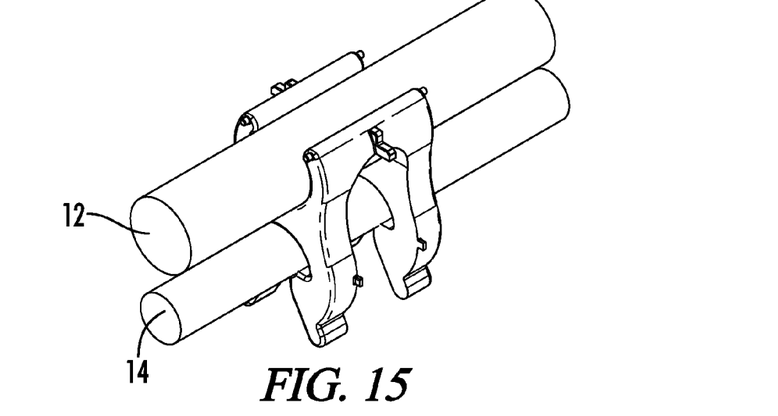
FIG. 15 is a perspective view of a clip like that of FIGS. 9-12 holding a larger diameter bar in place above and parallel to a smaller diameter bar.

Although the clip 60 is primarily designed for use in joining larger diameter bars on top of transversely oriented smaller diameter bars as illustrated in FIG. 14, it is noted that the clip 60 can also be utilized to join a smaller diameter bar to a larger diameter bar in parallel orientation as shown in FIG. 15.

Figure 27:
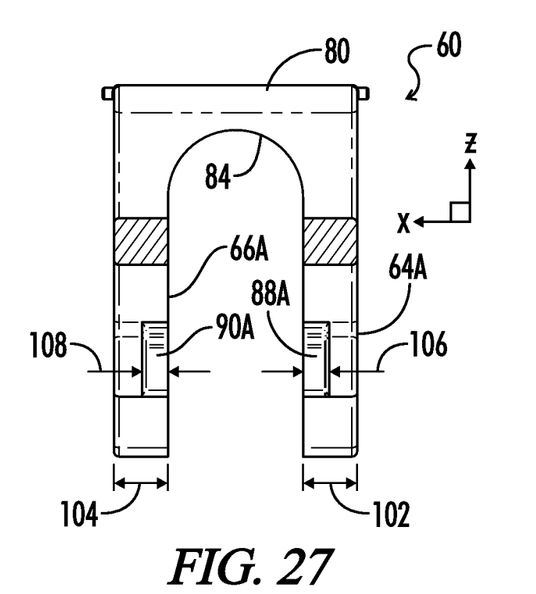
FIG. 27 is an elevation sectioned view similar to FIG. 10, showing an alternative version of the lower diameter reducing tabs.

In an alternative version of the clip 60 shown in FIG. 27, the tabs such as 88A and 90A have tab thicknesses 106 and 108 in the x-direction, the tab thicknesses being less than the leg thicknesses 102 and 104, respectively. Again, the tabs may be flush with the sides of the legs closest to the other pair of legs.

Methods of Manufacturing the Clips

The clips such as 10 and 60 described above are preferably injection molded from resilient plastic material.

It will be understood that when designing a system utilizing clip applying guns and clips like those just described, it is desirable for the system to provide the ability to join all of the types of rebar that will be needed, including parallel connections, transverse connections, connections between equal size bars, and connections between different size bars.

It will further be understood that it is desirable to provide such a system with the lowest possible manufacturing cost, and with the simplest possible mechanisms for use in the field.

It will be appreciated when viewing the clips 10 and 60 described above, that if the diameter reducing tabs were eliminated, the clip body is substantially identical to that such as disclosed in U.S. Patent Application Publication No. 2006/0248844 which is designed for parallel and/or transverse attachment of bars of equal diameter.

Figure 16:
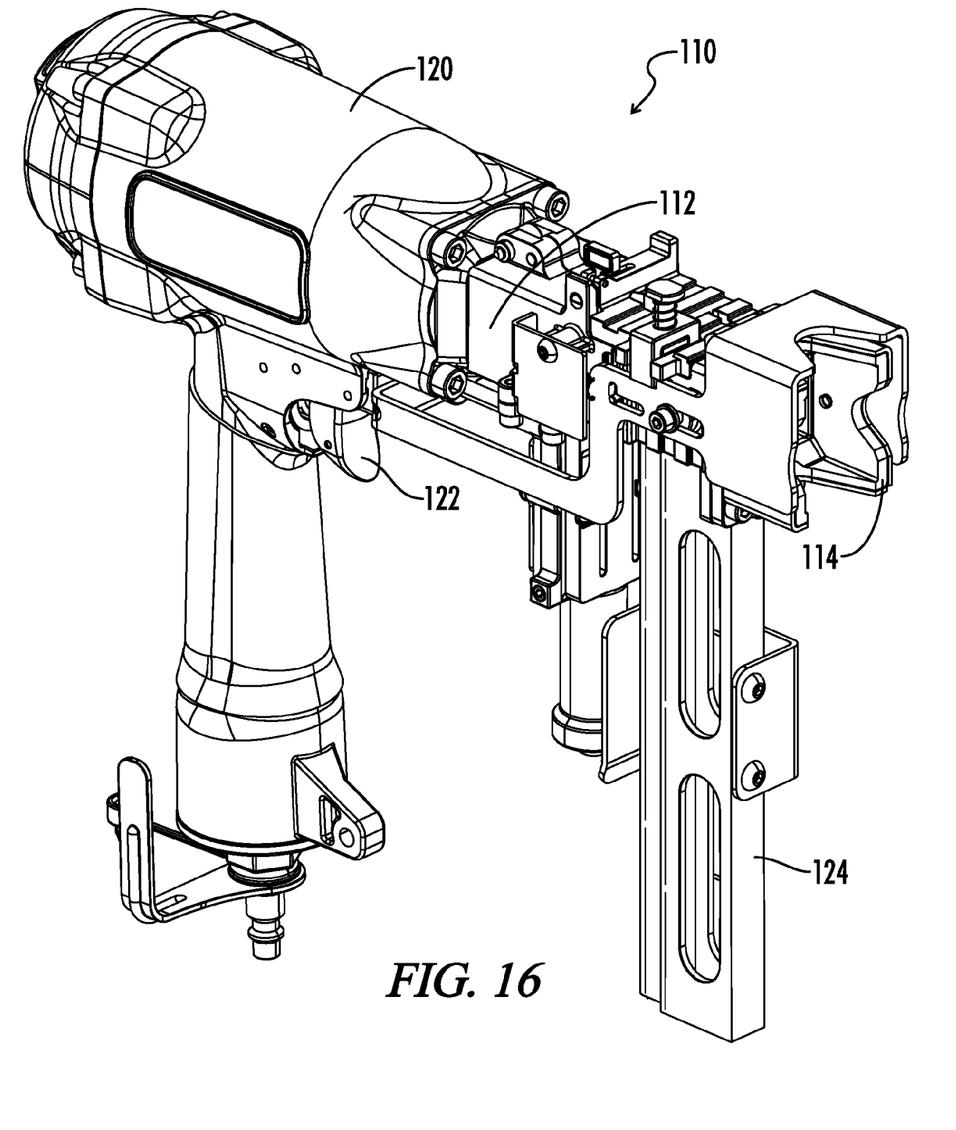
FIG. 16 is a perspective view of a clip applying apparatus or gun for applying clip strings like those of FIGS. 5 and 13 to connect reinforcing bars together.

It will also be understood that each clip applying gun such as that illustrated in FIGS. 16 and 17 and described below, will be designed for use with one nominal size clip which will fit properly within its internal clip chamber, and that clip size will be associated with a nominal diameter rebar for which the clip is designed.

The present invention provides a system wherein a clip body which has all of the external dimensions substantially equal to a clip body like that of U.S. Patent Application Publication No. 2006/0248844 designed for use with bars of equal diameter, can be modified to accept a bar of a smaller diameter in either its upper or lower arches.

This will permit the same clip applying gun to be used with clips designed for joining equal size bars of the larger nominal diameter, and also for joining one bar of the larger nominal diameter with another bar of the smaller nominal diameter.

Furthermore, the manufacture of the clips themselves is economized in that injection molds which have already been set up for manufacturing clips for use with bars of equal diameter, such as the clip of U.S. Patent Application Publication No. 2006/0248844, can be easily modified by having inserts placed therein to define the shape of the diameter reducing tabs such as described above, and thus the same molds can be used for molding clips including the diameter reducing tabs, thus saving greatly on mold construction costs.

The Clip Applying Gun

Referring now to FIGS. 16-25, the details of construction of a clip applying gun apparatus 110 are shown. The clip gun 110 can generally be described as having a barrel 112 having a distal end 114 with a clip receiving cavity 116 defined within the barrel 112. In the view of FIG. 17 the location of the clip receiving cavity 116 internally within the barrel 112 is shown in dashed lines. A hammer 118 is reciprocally received within the barrel 112. Again, in FIG. 17 the hammer and its location within the barrel is shown in dashed lines. A main drive mechanism 120 is connected to the hammer for reciprocating the hammer 118 within the barrel. A trigger assembly 122 is connected to the main drive 120 to actuate reciprocation of the hammer 118.

The various internal details of construction of the clip applying gun 110 are shown for example in Applicant's pending U.S. Patent application Ser. No. 12/762,409, filed Apr. 19, 2010 entitled Clip Gun With Pneumatic Feed, and assigned to the Assignee of the present invention, the details of which are incorporated herein by reference.

The clip applying gun 110 includes a clip track 124 aligned with the clip receiving cavity 116 for guiding a string 126 of frangibly connected clips into the cavity 116. It will be understood that the string of frangibly connected clips 126 may either be a string of clips 10 as shown in FIG. 5 having diameter reducing tabs in their upper arches, or a string of clips 60 such as shown in FIG. 13 having diameter reducing tabs in their lower arches, or a string of clips such as those illustrated in U.S. Patent Application Publication No. 2006/0248844 designed for use solely with equal diameter bars. As will be further explained below, the clip track 124 has been designed so as to be suitable for guiding any of those three types of clip strings, and the external dimensions of the clips of each of those types of clip strings will be substantially equal and will be associated with the nominal diameter of the larger nominal diameter bar 12.

The clip track or guide bar 124 has a cross-sectional shape as best seen in FIG. 19 perpendicular to its longitudinal axis 127 which is identified in FIG. 18. The longitudinal axis 127 is parallel to the y axis of the clips 10 and 60 described above. In FIG. 18 adjacent to the sample of the clip 10 shown in place upon the clip track 124 is a directional representation of the x, y and z axes of the clip 10.

The cross-sectional shape of the clip track 124 has a base portion 128 having a base width 130 defined between two base sides 132 and 134, and has a neck portion 136 having a neck width 138 defined between two neck sides 140 and 142.

As best seen in FIG. 19, the neck width 138 is less than the base width 130, and in the example shown, the neck width 138 is less than one half the base width 130.

In the example of FIGS. 18 and 19 the two base sides 132 and 134 are substantially parallel to each other, and the two neck sides 140 and 142 are substantially parallel to each other.

As best seen in FIG. 18, the neck portion 136 may extend for the entire longitudinal length of the clip track 124.

As best seen in FIG. 19, the neck portion 136 has a neck height 144 which in the example shown is greater than one half of the base width 130. It is noted that the neck height 144 can also be described as being greater than the radius of the circular portion of the upper arches 38 and 40.

Thus the clip track 124 can accommodate a clip string 126 of a nominal size corresponding to the larger nominal diameter rebar 12, regardless of whether that clip string includes diameter reducing tabs in its upper arches. If the clips are like clip 10 as illustrated in FIG. 18, the neck portion 136 of clip track 144 will be closely received within the vertical slots 50 between the diameter reducing tabs 42 and 44. If the clips do not include diameter reducing tabs in their upper arches, the centermost highest portion of the upper arch will simply ride upon a laterally outermost edge 146 of the neck portion 136 of clip track 124.

Figure 26:
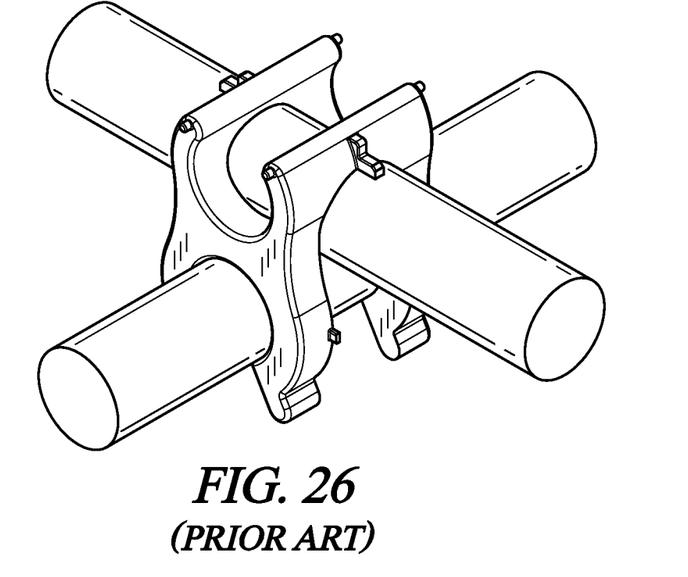
FIG. 26 is a perspective view of a prior art clip in place on two transversely crossed rebars of equal diameter.

The clip track 124 permits the clip applying apparatus 110 to selectively receive and guide into the cavity either a prior art string of clips for joining two equal diameter crossed rebars, such as illustrated for example in FIG. 26, or either of the strings of clips described with regard to FIGS. 1-15 above for joining a smaller diameter rebar to a larger diameter rebar. Particularly, when the clips of FIGS. 1-7 having diameter reducing tabs in their upper arches are utilized, the neck portion 136 of clip track 144 is closely received within the slots 50 of the clips to guide the clip string along the clip track.

Thus the clip track 124 allows a clip applying apparatus which was previously designed for use with clips designed solely for joining bars of equal diameter, to now be used with clips for joining smaller bars to a bar of the larger diameter.

The Clip Retainers

Turning now to FIGS. 20-24, an optional feature of a retainer clip designed for use with the clip track 124 is shown.

Figure 20:
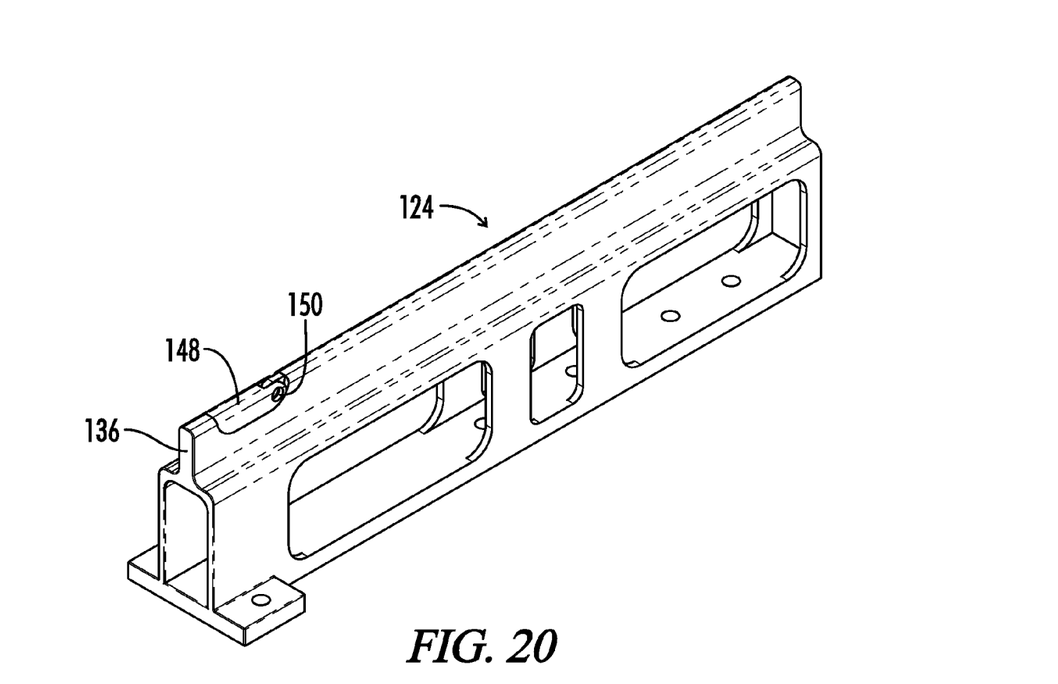
FIG. 20 is a perspective view similar to FIG. 18 of the proximal end of the clip track, showing a modified version thereof including one embodiment of a resiliently biased clip retainer.
Figure 21:
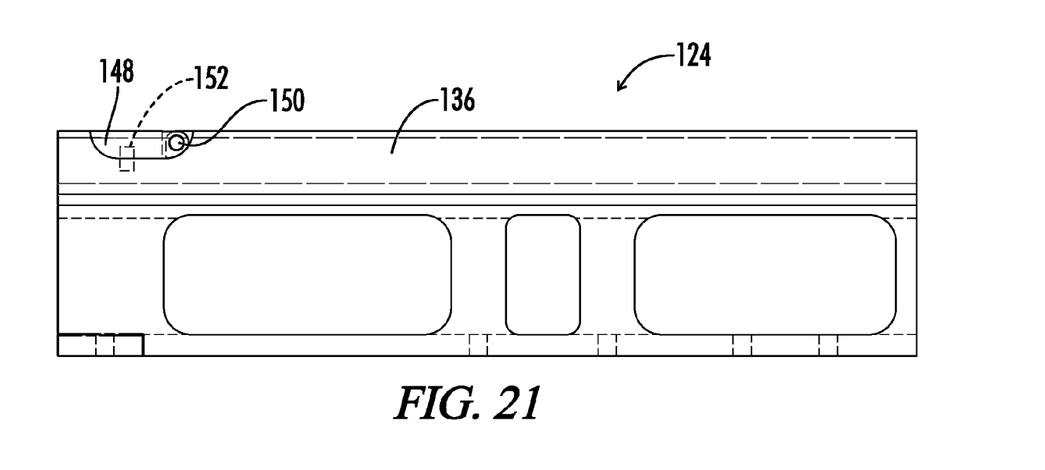
FIG. 21 is a side elevation view of the clip track of FIG. 20.

In a first embodiment shown in FIGS. 20, 21 and 24, a clip string retainer 148 is pivotally connected to the neck portion 136 by pivot pin 150. A biasing spring 152 is schematically illustrated in FIG. 21 and biases the clip retainer 148 from the closed or retracted position of FIGS. 20 and 21 toward an open or extended position as shown in FIG. 24. In FIG. 24 the manner in which the retainer 148 would engage one of the clips 10 of the clip string is illustrated.

Figure 22:
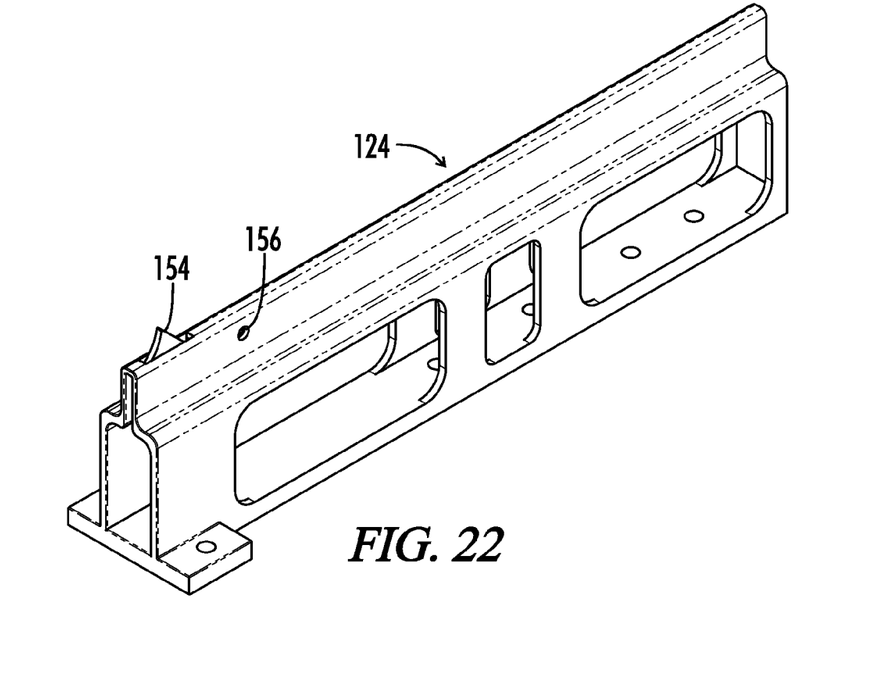
FIG. 22 is a perspective view of another embodiment of a clip track similar to FIG. 18, having a second embodiment of a resiliently biased clip retainer shown therein.
Figure 23:
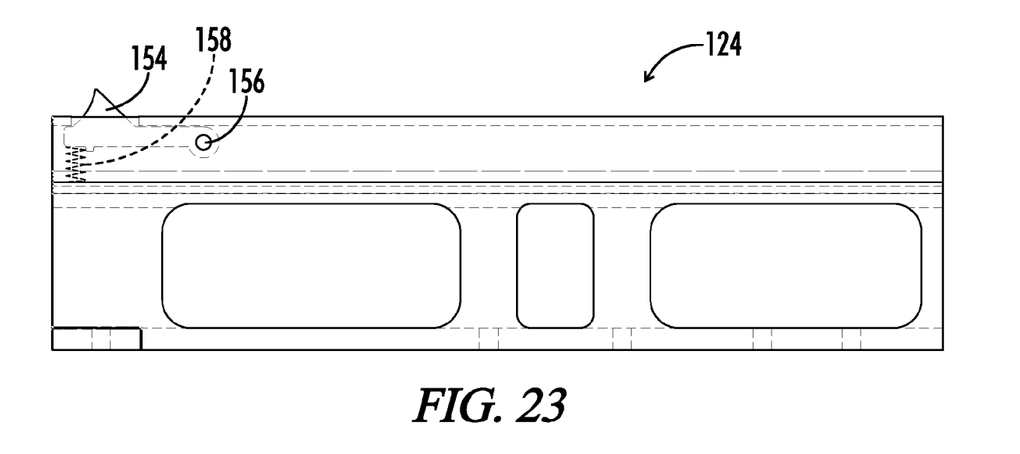
FIG. 23 is a side elevation view of the clip track of FIG. 22.

In an alternative embodiment as shown in FIGS. 22 and 23, a clip string retainer 154 is pivotally connected at 156 and is biased toward its extended position by a spring schematically shown as 158.

The Support Brace

Figure 25:
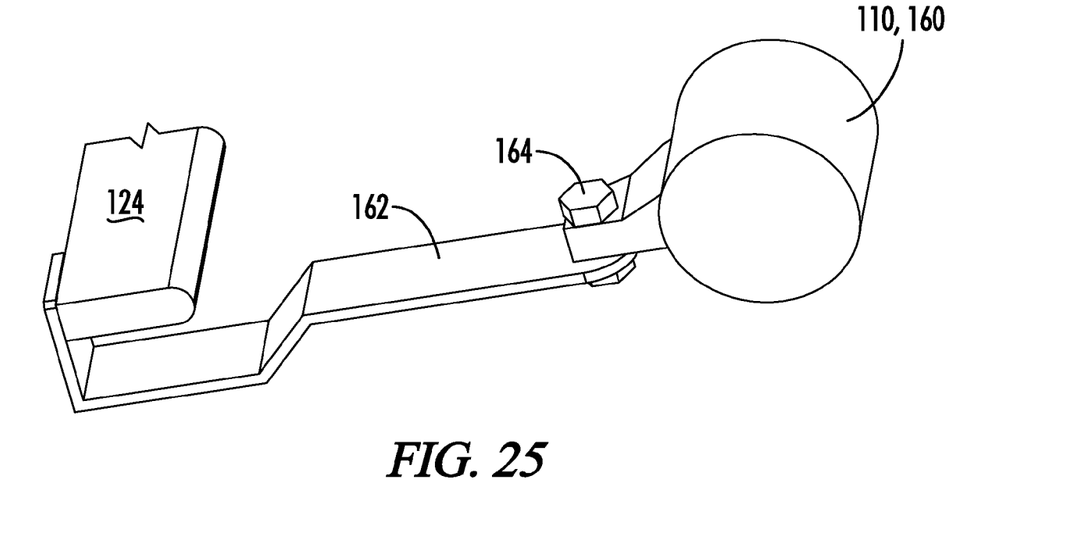
FIG. 25 is a perspective schematic view showing a brace for supporting a distal end of the clip track from a handle of the clip applying gun.

One final optional feature for the clip applying gun 110 is shown in FIG. 25. In FIG. 25 a barrel handle portion 160 of the gun 110 is schematically shown, as is a distal end portion of the clip track 124. A brace 122 is shown attached to the handle 160 via bolt or other suitable fastener 164 and attached to the distal end portion of the clip track 112.

It is noted in reference to FIG. 18, that the distal end portion of clip track 124 has two fastener holes 166 and 168 defined therein through which screws or other suitable fasteners extend to connect the clip track 124 to the brace 162.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A rebar clip for joining a larger nominal diameter rebar and a smaller nominal diameter rebar crossed perpendicularly to each other, the clip comprising:
    a clip body;
    a lower pair of aligned partially circular lower lateral openings defined in the clip body and aligned in a first direction;
    an upper pair of aligned partially circular upper lateral openings defined in the clip body transversely to the first direction;
    wherein both the lower pair of lateral openings and the upper pair of lateral openings are of the larger nominal diameter;
    the clip body being downwardly open below both the lower and upper pairs of lateral openings so that the clip can be pressed downward over the crossed larger and smaller nominal diameter rebars; and
    a pair of opposed diameter reducing tabs extending toward each other into the lower pair of lateral openings, so that the clip can hold the larger nominal diameter rebar in place above the smaller nominal diameter rebar.

2. The rebar clip of claim 1, wherein:
    each pair of the diameter reducing tabs includes opposed obliquely upward facing concave corners for engaging the smaller nominal diameter rebar from below.

3. The rebar clip of claim 1, wherein:
    the clip body includes two pairs of downwardly extending resilient legs;
    the lower pair of aligned partially circular lower lateral openings are defined by the two pairs of legs, each pair of legs defining a lower gap dimension smaller than the smaller nominal diameter; and the diameter reducing tabs extend no closer to each other than said gap dimension.

4. The rebar clip of claim 3, wherein:

the legs of each pair of legs are downwardly flared away from each other to provide a tapered guide into the gap for a lower one of the crossed rebars;

and the tabs associated with each pair of legs define a vertical constant width path of width substantially equal to the gap dimension.

5. The rebar clip of claim 1, wherein:

the clip body includes two pairs of downwardly extending resilient legs;

the lower pair of lateral openings are defined by the two pairs of legs, the legs having a leg thickness in the first direction; and the tabs have a tab thickness in the first direction, the tab thickness being less than the leg thickness.

6. The rebar clip of claim 5, wherein:

the tabs are flush with an inside surface of their respective legs, the inside surfaces of the legs being those surfaces which face the other pair of legs.

7. A rebar clip for joining a larger diameter rebar to a smaller diameter rebar transverse to the larger diameter rebar, the rebar clip comprising:

a clip body defined along x, y and z orthogonal directions;

the clip body including first and second pairs of resilient legs extending in the z-direction and defining first and second lower arches aligned parallel to the x-direction;

the clip body including first and second pairs of resilient arms extending in the z-direction away from the legs, the arms defining first and second upper cradles aligned parallel to the x-direction;

the clip body including first and second bridges joining distal ends of the first pair of arms to distal ends of the second pair of arms, the bridges and the arms defining first and second upper arches aligned parallel to the y-direction;

the lower arches, the upper cradles and the upper arches each including curved portions of the larger diameter; and pairs of diameter reducing tabs extending into either the lower arches or the upper arches for engaging the smaller diameter rebar.

8. The rebar clip of claim 7, wherein:

the diameter reducing tabs extend into the lower arches so that the clip can hold the larger diameter rebar in place above the smaller diameter rebar.

9. The rebar clip of claim 8, wherein:

each pair of diameter reducing tabs includes opposed obliquely upward facing concave corners for engaging the smaller diameter rebar from below.

10. The rebar clip of claim 8, wherein:

each pair of legs defines a lower gap dimension; and the diameter reducing tabs of each pair of tabs extend no closer to each other than said gap dimension.

11. The rebar clip of claim 10, wherein:

the legs of each pair of legs are downwardly flared away from each other to provide a tapered guide into the gap for a lower one of the crossed rebars;

and the tabs associated with each pair of legs define a vertical constant width path of width substantially equal to the gap dimension.

12. The rebar clip of claim 8, wherein:

the legs have a leg thickness in the x-direction; and the tabs have a tab thickness in the x-direction, the tab thickness being less than the leg thickness.

13. The rebar clip of claim 12, wherein:

the tabs are flush with sides of each pair of legs closest to the other pair of legs.

14. The rebar clip of claim 7, wherein:

the diameter reducing tabs extend into the upper arches so that the clip can hold the smaller diameter rebar in place above the larger diameter rebar.

15. The rebar clip of claim 14, wherein:

each pair of the diameter reducing tabs includes opposed obliquely downward facing concave corners for engaging the smaller diameter rebar from above.

16. The rebar clip of claim 14, wherein:

each pair of tabs define a vertical slot therebetween for receiving a guide bar.

17. A string of clips including the rebar clip of claim 16, each of the clips being substantially identical and the clips being joined together with the vertical slots between tabs being aligned with each other for receiving the guide bar to guide the string of clips.

18. The rebar clip of claim 7, wherein the clip comprises an integrally molded plastic clip.

* * * * *